US006983916B2

(12) United States Patent
Raynaud

(10) Patent No.: US 6,983,916 B2
(45) Date of Patent: Jan. 10, 2006

(54) TRIPOD FOR THE SUPPORT OF APPARATUS IN GENERAL AND, IN PARTICULAR, OF OPTICAL OR PHOTOGRAPHIC APPARATUS AND THE LIKE

(75) Inventor: Guy Raynaud, La Hays les Roses (FR)

(73) Assignee: Lino Manfrotto & Co. S.p.A., Bassano Del Grappa (IT)

( * ) Notice: Subject to any disclaimer, the term of this patent is extended or adjusted under 35 U.S.C. 154(b) by 0 days.

(21) Appl. No.: 10/507,851

(22) PCT Filed: Mar. 28, 2002

(86) PCT No.: PCT/IT02/00201

§ 371 (c)(1),
(2), (4) Date: Sep. 15, 2004

(87) PCT Pub. No.: WO03/083350

PCT Pub. Date: Oct. 9, 2003

(65) Prior Publication Data

US 2005/0082444 A1 Apr. 21, 2005

(51) Int. Cl.
F16M 11/00 (2006.01)
(52) U.S. Cl. .............................. 248/163.2; 248/177.1; 359/419
(58) Field of Classification Search .......... 248/163.2, 248/168, 170, 177.1, 179.1, 181.1, 181.2, 248/187.1, 288.31, 288.51; 359/419, 428
See application file for complete search history.

(56) References Cited

U.S. PATENT DOCUMENTS

| 4,019,710 | A | * | 4/1977 | O'Connor et al. | ....... 248/181.2 |
| 4,974,802 | A | * | 12/1990 | Hendren | .................. 248/181.1 |
| 5,341,185 | A | * | 8/1994 | Nakatani | ..................... 396/428 |
| 6,352,228 | B1 | * | 3/2002 | Buerklin | .................. 248/181.1 |

FOREIGN PATENT DOCUMENTS

| DE | 23 07 826 | | 8/1974 |
| DE | 3105989 | * | 8/1982 |
| DE | 31 34 910 A1 | | 3/1983 |
| FR | 1 125 182 | | 10/1956 |
| FR | 2 435 970 | | 4/1980 |

OTHER PUBLICATIONS

Jun. 18, 2004 IPER PCT/IT02/00201.
Nov. 29, 2002 ISR PCT/IT/02/00201.

* cited by examiner

*Primary Examiner*—Ramon O Ramirez
(74) *Attorney, Agent, or Firm*—Castellano Malm Ferrari & Buck PLLC

(57) ABSTRACT

A tripod (1) for the support of apparatus in general and, in particular, of optical or photographic apparatus and the like is described and comprises a spider (3) in which a plurality of legs (2) converge and a pillar (12) arranged to receive the apparatus and having a stem (11) housed in a seat (4) of the spider, the seat extending through a pivotably adjustable element (21) of an articulated joint (22) formed in the spider.

6 Claims, 2 Drawing Sheets

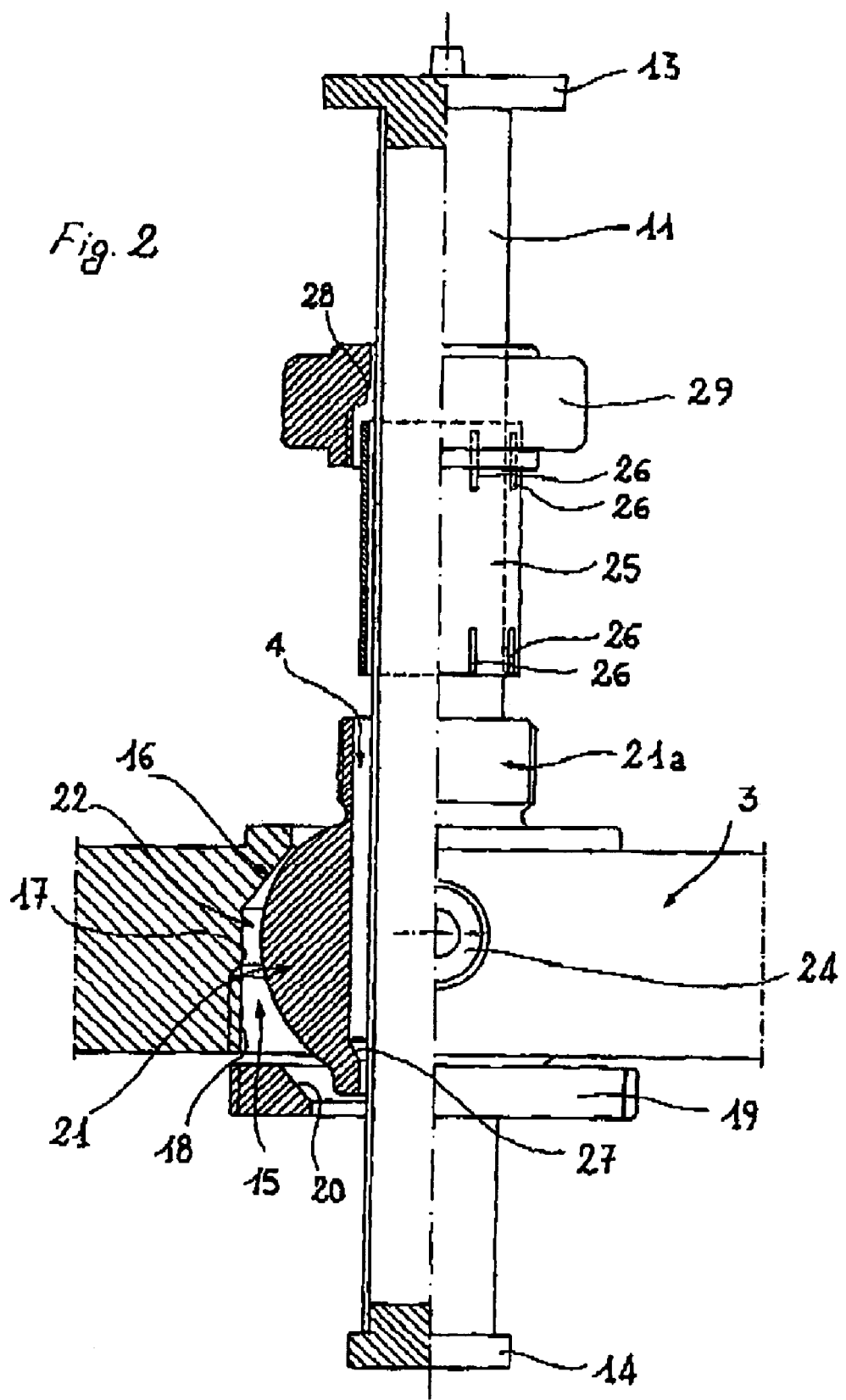

TRIPOD FOR THE SUPPORT OF APPARATUS IN GENERAL AND, IN PARTICULAR, OF OPTICAL OR PHOTOGRAPHIC APPARATUS AND THE LIKE

CLAIM FOR PRIORITY

This application is a U.S. National Phase application of PCT/IT02/00201 filed on Mar. 28, 2002, which is incorporated herein by reference in its entirety.

TECHNICAL FIELD

The subject of the present invention is a tripod for the support of apparatus in general and, in particular, of optical or photographic apparatus and the like. In the following context, the term tripod is used in a broad sense to indicate a structure with three or more legs converging in a spider on which means, typically a pillar of adjustable height, are arranged for supporting the apparatus indicated above.

TECHNOLOGICAL BACKGROUND

Tripods including the above-mentioned characteristics are used widely in the photographic and cinematographic fields for the orientable support of cameras. In this field, a need arises to position the stand or tripod with the pillar support mounted thereon and to be able to orient the apparatus mounted on the pillar about its own axis. This need arises typically in so-called panoramic shots.

In this situation, it is necessary to position the tripod with care so that the rotation of the apparatus takes place whilst the desired state of levelness is maintained. Cinematographic tripods and stands are also known, in which, to avoid the need for levelness, supports are used which have orientable platforms on which the head that supports the optical or photographic apparatus is mounted in turn. However, these supports have no slidable central pillar, which clearly limits the height adjustment of the apparatus.

DESCRIPTION OF THE INVENTION

The main aim of the invention is to provide a support which is designed structurally and functionally to overcome all of the disadvantages discussed with reference to the prior art mentioned.

Within the scope of this aim, an important object of the invention is to provide an easily adjustable support.

This aim with these and other objects are achieved by a support formed in accordance with the appended claims.

BRIEF DESCRIPTION OF THE DRAWINGS

The characteristics and the advantages of the invention will become clearer from the detailed description of a preferred embodiment thereof, described by way of non-limiting example, with reference to the appended drawings, in which:

FIG. 2 is a view showing, on an enlarged scale, a detail of the tripod of FIG. 1, half of which is shown in longitudinal section.

PREFERRED EMBODIMENT OF THE INVENTION

Figure 1:
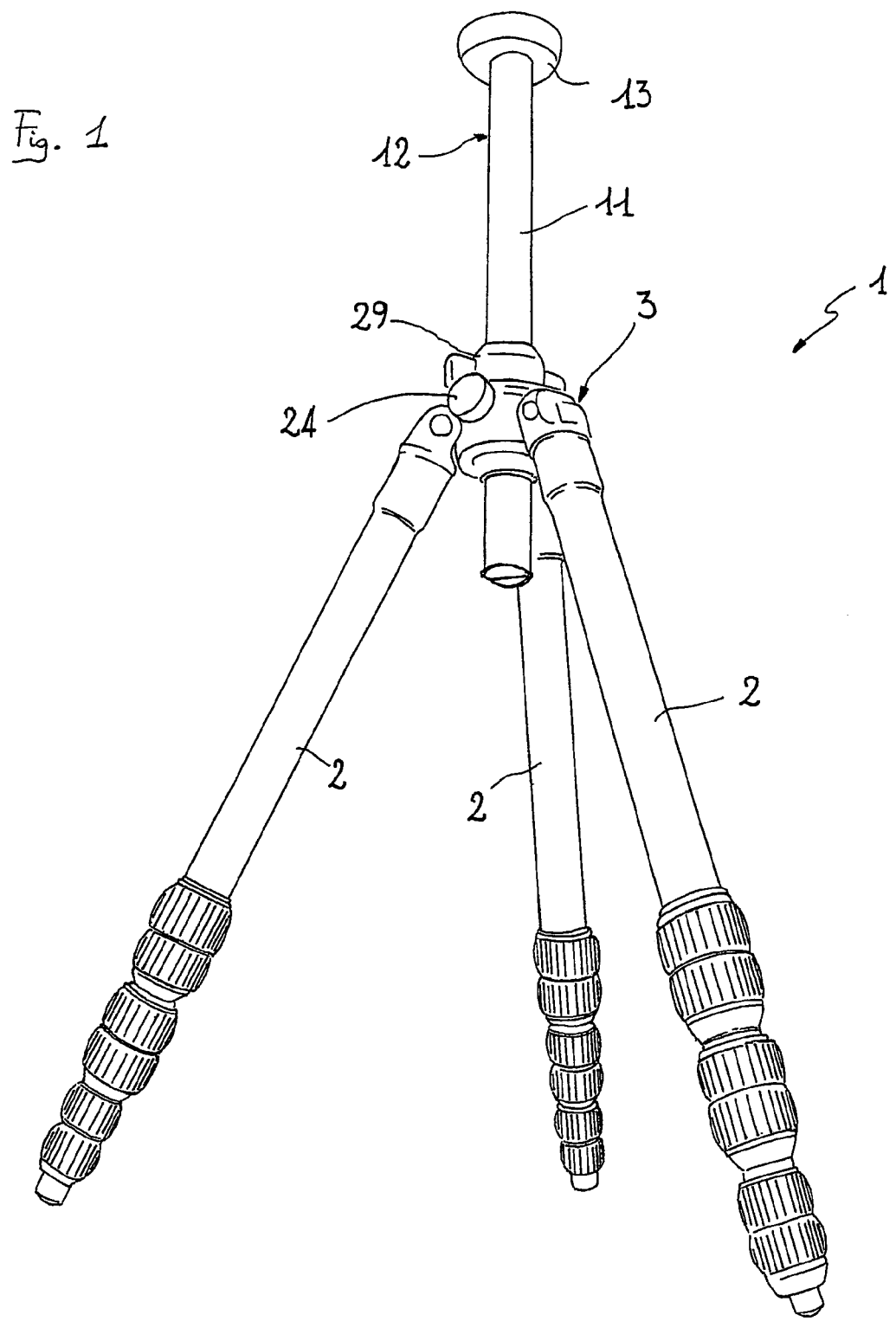
FIG. 1 is a perspective view of a tripod according to the invention.

In the drawings, a tripod for photographic and/or cinematographic uses, generally indicated 1, has legs 2 all of which converge in a spider 3, a seat 4 of which houses the stem 11 of a pillar 12 in manner such that it can slide axially and can be locked in an adjustable position.

The stem 11 has a tubular configuration with a circular cross-section and carries, at one of its ends, a platform 13 for the fixing of the desired apparatus. A projection 14 may optionally be formed at the opposite end for preventing the pillar 12 from accidentally slipping out of the seat 4.

The spider 3 has a through cavity 15 in which a conical surface 16 and a cylindrical portion 17, part of which has a thread 18, are identified. A ring nut 19, in turn having a conical surface 20 facing the surface 16, is screwed into the thread 18 in order to restrain a ball 21 pivotably in the cavity 15. The ball 21 and the cavity 15, with the respective conical surfaces, constitute a ball and socket joint, generally indicated 22, of which the ball 21 is the orientable element.

The ball 21 can be locked in the desired orientation by means of a revolving plug 24, the stem of which is screwed into a threaded radial hole in the spider 3.

The seat 4 is formed in the ball 21, coaxially with an externally threaded collar 21a projecting from the ball 21. A cylindrical sleeve 25 arranged and restrained in the seat 4 has slots 26 at its longitudinally opposite ends for rendering the sleeve radially contractible. The stem 11 of the pillar 12 is fitted in the sleeve 25 and can be locked relative to the ball 21 by clamping means which comprise juxtaposed conical surfaces 27, 28 formed, respectively, in the seat 4 and in a facing position inside a ring nut 29 that can be screwed onto the collar 21a. Screwing of the ring nut 29 onto the collar 21a moves the conical surfaces 27, 28 towards one another, resulting in radial compression of the opposite ends of the sleeve 25 and clamping thereof onto the stem 11 of the pillar 12. The sleeve 15 is also restrained axially in the seat 4.

Once the tripod 1 has been positioned and the spider 3 has been levelled approximately by positioning of the legs 2, the revolving plug 24 is loosened in order to orient the pillar 12 in the desired manner, together with the ball 21. The orienting of the pillar in order to level the platform 13 may be assisted by the presence of a spirit level, not shown, on the platform 13. Tightening of the revolving plug locks the pivoting of the ball 21 relative to the spider 3. Prior to the levelling of the pillar 12, or afterwards, the height of the pillar 12 is adjusted by loosening the ring nut 29 so as to release the pillar for sliding axially in the seat 4. When the desired adjustment has been reached, the ring nut 29 is tightened so as to lock the sliding of the pillar in the ball again. It is pointed out that, since the levelling is achieved by varying the position of the axis of the pillar relative to the spider, this levelling is maintained even during subsequent vertical adjustment of the pillar.

The invention described above enables many advantages to be achieved, amongst which the following are the most important:

the apparatus can be levelled more quickly, by virtue of a single operation on the central pillar, rather than on the three telescopic legs of the tripod, the apparatus retains a large degree of freedom of positioning, by virtue of the ability of the central pillar to slide vertically and to rotate, and the apparatus retains excellent stability by virtue of the positioning of the orientable joint inside the spider, which ensures that the weight of the apparatus is vertically aligned with the spider.

What is claimed is:

1. A tripod for the support of apparatus comprising a spider (3) in which a plurality of legs (2) converge and a pillar (12) arranged to receive the apparatus and having a stem (11) housed in a seat (4) of the spider, said pillar (12) being slidable axially in an adjustable manner in the seat and the seat extending through an orientable element (21) of an articulated joint (22) formed in the spider, wherein said joint (22) is a ball and socket joint comprising a ball (21) arranged in a cavity (15), said tripod also comprising locking means (24) to lock said ball (21) in the desired orientation, wherein said tripod comprises restraining means (19), independent of said locking means (24), to restrain said ball (21) pivotably in the cavity (15); and a sleeve (25) arranged in the seat and clamping means (27, 28, 29) to clamp said sleeve (25) onto the pillar (12) to prevent axial sliding thereof.

2. A tripod according to claim 1 in which the sleeve (25) is radially contractible in the region of at least one of its axial ends, and the clamping means (27, 28, 29) are provided on the orientable element (21) and are able to compress the sleeve radially in the region of the at least one end as a result of the operation of the clamping means.

3. A tripod according to claim 1 in which the clamping means comprise a ring nut (29) engaged by screwing on a threaded collar (21a) fixed firmly to the ball (21) and a conical surface (27) formed in the ring nut (29) and acting on a facing end of the sleeve (25) to exert a clamping force as a result of screwing the ring nut onto the collar.

4. A tripod according to claim 3 in which the clamping means comprise a second conical surface (28) formed in the seat (4) at an end remote from the collar (21a) and acting on an opposite end of the sleeve from the facing end of the sleeve, said opposite end being radially contractible.

5. A tripod according to claim 1 in which the ball (21) is housed in said cavity (15) of the spider (3) between two facing abutment surfaces (16, 20).

6. A tripod according to claim 1 in which pressure means (24) are provided on the spider and act on the orientable element (21) to prevent said orientable element from pivoting relative to the spider.

* * * * *